United States Patent [19]

Vignola

[11] Patent Number: 4,770,788
[45] Date of Patent: Sep. 13, 1988

[54] PROCESS FOR REMOVING METAL COMPLEXES FROM WASTE SOLUTIONS

[75] Inventor: Michael Vignola, Bayville, N.Y.

[73] Assignee: Kollmorgen Technologies Corp., Dallas, Tex.

[21] Appl. No.: 727,117

[22] Filed: Apr. 25, 1985

[51] Int. Cl.$^4$ .............................................. C02F 1/42
[52] U.S. Cl. .................................... 210/670; 210/674; 210/684
[58] Field of Search ............... 210/670, 684, 672, 674; 423/24, 49, 54, 89, 100, 139, 157

[56] References Cited

U.S. PATENT DOCUMENTS

| | | | |
|---|---|---|---|
| 2,871,142 | 1/1959 | Hays | 117/102 |
| 2,962,351 | 11/1960 | Stevenson | 210/684 |
| 2,965,441 | 12/1960 | Welton | 23/79 |
| 2,980,607 | 4/1961 | Mock et al. | 210/31 |
| 2,993,782 | 7/1961 | Hampton et al. | 75/108 |
| 3,148,947 | 9/1964 | Fleischmann | 210/684 |
| 3,664,870 | 5/1972 | Oberhofer et al. | 210/684 |
| 4,267,159 | 5/1981 | Crits | 423/371 |
| 4,303,704 | 12/1981 | Courduvelis et al. | 210/912 |

FOREIGN PATENT DOCUMENTS 1529151  4/1976  United Kingdom .

OTHER PUBLICATIONS

Chemical Abstracts, vol. 83, No. 4, (Jul. 29, 1975).
Delmas, D., et al., "Etude de la fixation de complexes aminopolycarboxylates du cuivre et du cobalt sur resines exchangeuses d'ions", *Analysis*, 1975, vol. 3, No. 1, pp. 39–43.
Krieg, Abraham, "Processing Procedures", Symposium on Electroless Plating Process, p. 21.
Kraus, Kurt A., et al., "Metal Separation by Anion Exchange", ASTM Symposium on Ion Exchange, pp. 27–57.

*Primary Examiner*—Ivars Cintins
*Attorney, Agent, or Firm*—Morgan & Finnegan

[57] ABSTRACT

This invention relates to a process for treating waste solutions and rinse waters, especially those from electroless plating processes to remove organometallic complexes and complexing agents, particularly copper and copper-EDTA complexes by eluting the waste solutions through anionic exchange resins.

18 Claims, 1 Drawing Sheet

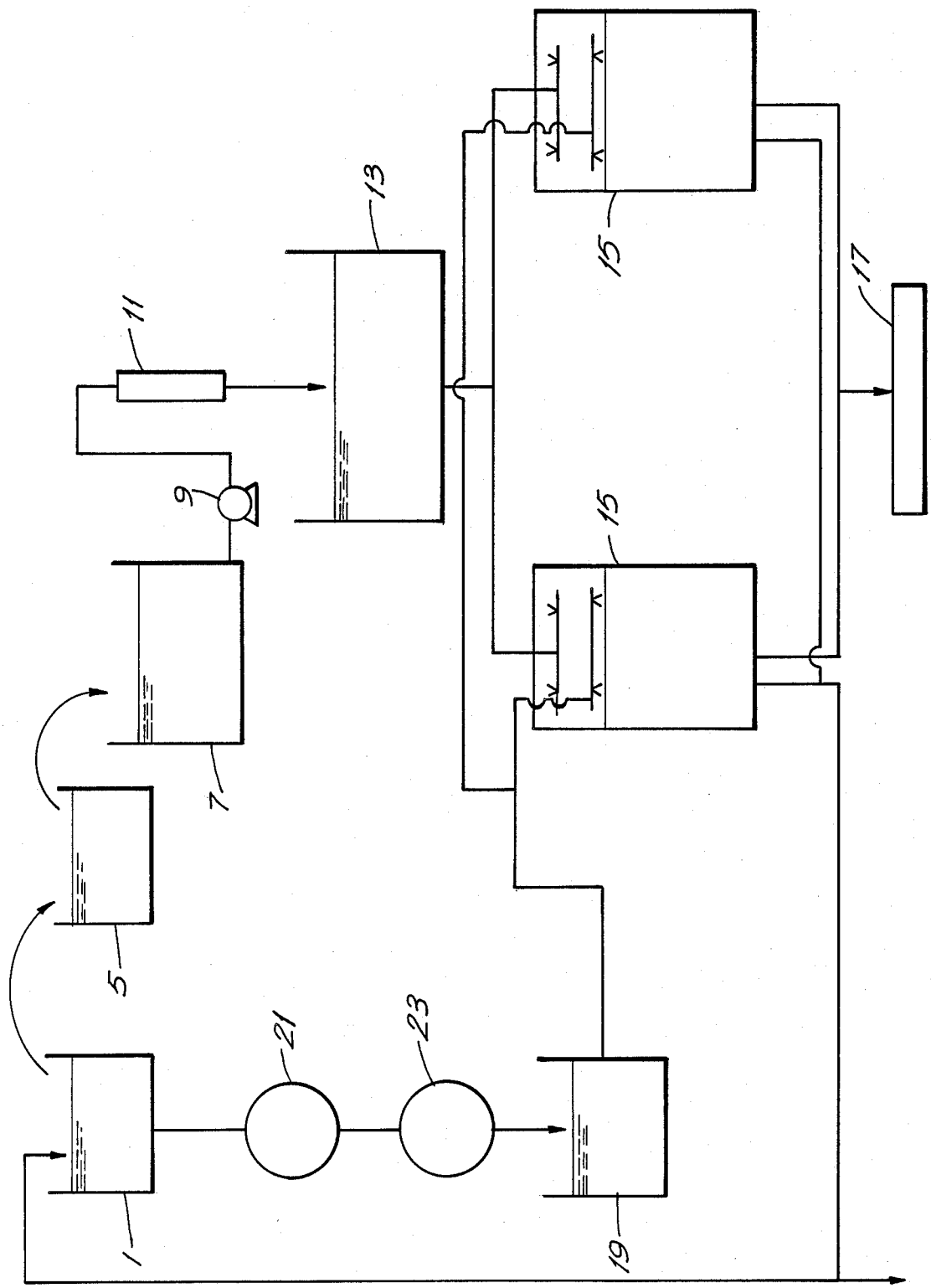

PROCESS FOR REMOVING METAL COMPLEXES FROM WASTE SOLUTIONS

This invention relates to a process for removing metal ion-chelate complexes and free complexing agents from waste solutions using anionic exchange resin. More particularly, this invention relates to removing metal ions from electroless plating rinses.

BACKGROUND OF THE INVENTION

Many manufacturing processes produce waste streams which, if expelled from plants without further treatment, pollute the environment. Failure to treat these waste streams also results in the loss of valuable materials which can be recovered and reused in the manufacturing process. Moreover, the Federal government regulates the concentrations of certain materials in effluent streams. It has been especially difficult to treat very dilute waste streams economically, such as those which are produced by plating processes and related rinsing operations, in particular, electroless plating processes. Attempts have been made to use sulphide precipitation and starch xanthate processes for this purpose, but they have proven expensive, difficult to control. Further, they produce precipitate end products which are hard to flocculate and filter.

Many plating processes produce, inter alia, waste streams having dilute concentrations of metal ions which are complexed with organic molecules. Metal ions exist in waste streams in a complexed form with a chelating agent. Regulations set very strict standards for metal ion concentrations in the effluent from these processes. Moreover, the metal ions and chelating agents in the waste streams are valuable and have the potential to be recycled through the process. There have been many attempts to recover the chemicals from these waste solutions.

For example, it has been suggested that an ion exchange resin which acts as a very powerful complexing agent selectively removes copper from the copper complexes in the effluent. One such resin has an iminodiacetic functional group (R. M. Spearot et al., "Recovery Process for Complexed Copper Bearing Rinse Waters", *Environmental Progress*, Vol. 3, No. 2, p. 124, 1984). However, this resin was unable to remove copper from effluent in the presence of ethylenediaminetetraacetic acid (EDTA), a complexing agent which is often used in electroless plating processes.

It is generally believed that using an anionic exchange resin to remove transition metal ions complexed with a compound in the plating bath rinse, such as EDTA, would not operate to remove these complexes because the anions of the salts in the bath rinse would be more strongly attracted to the resin than the ions, complexes or complexing agents to be removed.

It has been suggested to treat an anionic exchange resin with EDTA, for example, and utilize the treated resin to chromatographically separate metals from a solution.

Courdevalis, et al. have suggested trying to remove copper from its complexes by using a resin prepared by reacting polyethyleneimine with chloracetic acid and cross-linking the polymer (*Plating and Surface Finishing*, "A New Treatment for Wastewater Containing Metal Complexes", March 1983, p. 70 and U.S. Pat. No. 4,303,704). This method was unsuccessful in removing copper from an EDTA complex, although it could be used to remove copper from a solution containing tartrate, or an organic acid ester or N,N,N',N' tetrakis-(2 hydroxypropyl) ethylene diamine, an alkanolamine chelator.

U.S. Pat. No. 4,076,618 describes the use of strong cationic resin with a sulfonic or carboxylic acid functional group to extract cupric ion and alkanolamine chelator complexes.

It is, therefore, an object of this invention, to provide a process for removing metals from waste solutions such that the waste solutions meet levels dictated by regulation.

It is a further object of this invention to provide a process to remove chelated copper ions which are complexed with a wide variety of complexing agents from waste solutions.

It is still a further object of this invention to provide a process to remove copper EDTA complexes from waste solutions.

BRIEF DESCRIPTION OF THE FIGURE

The FIGURE is a flow chart for a system for treating waste solutions from plating baths employing the method of this invention.

DEFINITIONS

Certain terminology that will be used throughout the description of the process of this invention is defined as follows:

"Bed volume" is the volume of resin that is present in an ion exhange column.

"Breakthrough" is the point at which the concentration of the ions being adsorbed to the ion exchange resin rises to an appreciable value in the column effluent.

SUMMARY OF THE INVENTION

It has now been discovered that waste solutions containing metal ion complexes may be treated to remove certain metal ion complexes, particularly transition metal complexes and more particularly EDTA copper complexes, using anionic exchange resins. The novel process of this invention removes anionic organometallic complexes from waste solutions, particularly those of electroless plating baths, with high efficiency. Surprisingly, the process of this invention removes EDTA copper complexes as well as other organometallic complexes.

DETAILED DESCRIPTION OF THE PREFERRED EMBODIMENTS

The process of this invention removes organometallic complexes from waste solutions by contacting the waste solution with an anionic exchange resin.

It had been generally believed that a cationic resin should remove the copper from complexes. Surprisingly, however, it has been found that anionic resins remove such complexes, due to the negative charge on the complexes.

The ion exchange resin used in the process of this invention is preferably a strong base anionic exchange resin. Preferably, it contains quaternary ammonium groups or similar strongly basic groups incorporated into the framework. Preferably, the resin framework should be a polystyrene. A macroreticular type or a gellular type resin may be used. Macroroticular resin is a large pore size resin having a rigid shape. Gellular resin shrinks and swells on contact with liquid. The use of cellular resin is preferred, because the potential flow rate through the resin and the treatment capacity is higher when cellular resin is used.

The process of this invention is preferably performed using a vertical column to contain the ion exchange resin. Preferably, the flow rate of solution through the column is 1-100 liter/hour/liter resin. However, any type of ion exchange bed can be used. The height of the column and the aspect ratio (height: diameter) are not critical to the efficient operation of the treatment process of this invention. Other methods of contacting the waste solution with ion exchange resins may be used. Included among these processes are moving bed ion exchange and liquid systems using liquid ion exchange resins. The process of this invention can be performed efficiently at a wide range of atmospheric temperatures and pressures.

Because the organometallic complex is a weaker anion than the free complexing agent, it has a slightly lower affinity for the anionic resin than does the free complexing agent (or "coordinating ligand") molecule. This difference in affinities provides a means for separating the free ligand molecules and the metal ligand coordination compound. Two zones are created in the resin: a leading zone, in which the resin contains organometallic coordination compounds, and a trailing zone, in which the organometallic complexes have been replaced by free coordinating ligand molecules. The resin may be placed in a column and the waste solution eluted down through the resin bed, and the treated water effluent collected at the bottom of the bed. As the resin becomes exhausted, the two zones also move downward toward the bottom of the bed. When the leading zone reaches the exit portion of the resin bed, a "breakthrough" of organometallic-containing solution takes place, at which point the process is terminated and the resin should be regenerated.

The pH of the waste solution during the treatment process of this invention is dependent on the composition of the plating bath. It is preferably kept between about 3 and about 12.4. For example, an EDTA solution containing copper chloride is optionally treated at a pH of between 9 and 10.5. However an EDTA solution with copper sulfate can be treated at any pH. Using the appropriate pH may increase the capacity of the resin from 250 to 800 bed volumes prior to exhaustion.

Various complexing agents and metal ions may be present in the waste solutions of this invention, in particular, anionic complexing agents. Among the complexing agents which may be present with anionic complexing agents are non anionic complexing agents such as alkanolamine and non alkanolamine complexing agents, such as N,N,N',N'-tetrakis(2-hydroxypropyl) ethylenediamine (Quadrol TM, a trademark of BASF-Wyandotte Corporation) and triethanolamine. Anionic complexing agents include organic acids, organic acid esters, and salts of organic acids for example, citrates, tartrates, succinates, lactates, glycolates, and Rochelle salts and the like. Other coordinating liquids or complexing agents include amino acids such as ethylenediamine tetraacetic acid (EDTA).

Metals which are generally present in waste solutions of plating operations and which can exist in chelated form are subject to the treatment process of this invention. This invention is especially suited for treatment of complexes of metals which form organometallic complexes with complexing agents which are more stable than the complexes the metals can form with other ions in the waste solution, e.g. more stable than the metal chloride complexes, metal-amine complexes or metal-ethanolamine complexes. Transition metals such as copper and nickel are among those generally present in such plating processes and which form such complexes. It is believed that other transition metals and alkaline earth metals which complex with EDTA or other organic complexing agents are subject to treatment using the method of this invention, for example, lead, cadmium, iron, calcium, magnesium, barium, cobalt, chromium, manganese, zinc and the like. For example, in nickel plating baths, nickel may be present with complexing agents such as citrates, acetates, EDTA, ethylenediamine and triethanolamine. In boiler cleaning and anti-fouling operations, iron may be present with a complexing agent such as EDTA, citrate and the like. The wash streams from these operations may be treated using the method of this invention.

Anions which do not combine with metal ions to form organometallic complexes are also generally present in the waste solution, e.g. sulfates, chlorides, and the like. The ion exchange resin is preferably loaded with a monovalent anion present in a neutral salt solution prior to eluting the waste solution through the column, i.e. the resin should be loaded with an anion having a lower charge density and a lower selectivity coefficient than the complexed anion.

Preferably, the anionic exchange resin is regenerated when breakthrough occurs. Regeneration is preferably performed with a salt solution. Prior art processes would have suggested that regeneration be undertaken with an hydroxide solution. However, the bond of the organometallic complex may be unstable under extremely alkaline conditions and cause the precipitation of metallic oxide or metallic hydroxide in the pores of the resin when hydroxide is used to regenerate the resin bed.

In the process of this invention, the regeneration of the resin is accomplished with an inorganic salt solution such as sodium chloride and the like so as to preserve the integrity of the organometallic complex. This allows the recovery of the complexing agent as well as the complex itself for reuse in the plating process from which it came.

The steps of the regeneration process depend upon both the composition of the original plating waste solution and the desired form of the effluent from the regeneration process. If it is desired that the regeneration effluent be composed of both free complexing agent and organometallic complex, a simple salt regeneration solution should be eluted through the resin bed, displacing both free complexing agent and organometallic complex from the resin. If, however, it is desired that the organometallic complex solution be separated from the free complexing agent, the column is first eluted with a solution of complexing agent. Because the free complexing agent has a higher affinity for the resin than does the organometallic complex, it displaces the complex. The column is then eluted with salt solution to displace the complexing agent.

The process of this invention may also be used to produce an organometallic plating solution from a metal salt solution. The resulting plating solution will have a low concentration of inorganic anions. A solution of the complexing agent is eluted through the column, thus placing the resin in a form having free complexing agent bonded to the functional groups. An uncomplexed metal solution is passed through the column and the metal ions complex with the free complexing agent. When the remaining complexing agent has reacted with metal ions, deionized water is passed through the column to rinse away excess metal. A complexing agent solution is then eluted through the system, displacing organometallic complexes and rinsing them from the column.

The process of this invention may be implemented in a two-resin bed ion exchange system, thus optimizing capacity. Referring to the FIGURE, the waste solution from plating bath 1 is sent to a rinse bath 5 in which the waste solution is mixed with water. The resulting solution is routed to sump 7 from which the solution is pumped by pump 9 into particulate filter 11. From filter 11, the solution is sent to equalization tank 13, which prevent spikes in concentration of the different elements of the waste solution composition. The waste solution is then sent to one of ion exchange columns 15. Ion exchange column 15 is approximately 50-75% filled with anionic exchange resin. The waste solution is eluted through ion exchange column 15 in which it undergoes treatment for removal of organometallic complexes. The eluted solution is sent to a sewer 17.

To regenerate the ion exchange column 15, a salt solution from tank 19 is sent through the resin bed in column 15. The salt solution may be made up fresh or it may be obtained from plating bath 1. The plating solution from plating bath 1 is treated in treatment tank 21 such that the copper is plated out of solution and in tank 23 such that the EDTA is precipitated out of solution. The remaining salt solution is sent to salt tank 19.

The eluted solution from the treatment process taking place in ion exchange column 15 may be discarded or it may be recycled and reused as recovered bath to plating bath 1.

The following examples further illustrate the treatment process of this invention. Of course, these examples do not serve to limit its scope in any way.

EXAMPLE 1

Five hundred milliliters (ml) of a strong base anionic macroreticular ion exchange resin having guaternary amine functional groups in a polystyrene framework, which is commercially available from Rohm & Haas Corp as IRA-900, was loaded into a one liter ion exchange column. The resin's anion was the chloride ion. A waste stream of rinse water from an electroless copper plating solution having the following composition:

| | |
|---|---|
| Copper-EDTA chelate | 0.5 mmol/liter |
| EDTA | 0.5 mmol/liter |
| Potassium Chloride | 2.0 mmol/liter |
| Potassium Formate | 2.0 mmol/liter |
| N,N,N',N'— tetrakis (2-hydroxypropyl) ethylene diamine | 0.07 mmol/liter | was eluted through the column at a rate of 70 ml/min, or 1 gpm/ft$^3$. After every forty bed volumes i.e., every 20 liters, of rinse water put through the copper concentration of the effluent sample was measured in milligrams copper per liter of effluent. Table I shows the results of these measurements.

TABLE I

| Bed Volumes | Copper Concentration (mg/l) |
|---|---|
| 40 | 0.1 |
| 80 | 0.3 |

TABLE I-continued

| Bed Volumes | Copper Concentration (mg/l) |
|---|---|
| 120 | 0.4 |
| 160 | 0.5 |
| 200 | 0.6 |
| 240 | 1.2 |
| 280 | 0.6 |

EXAMPLE 2

Three hundred mls of the same strong basic anionic resin used in Example 1 were loaded into a 0.6 l column. Electroless plating process rinse water having the following composition:

| | |
|---|---|
| Copper/EDTA chelate | 0.28 mmol/l |
| EDTA | 0.28 mmol/l |
| KCl | 1.13 mmol/l |
| Potassium Formate | 1.13 mmol/l |
| N,N,N',N'— tetrakis (2-hydroxypropyl) ethylene diamine | 0.04 mmol/l |
| Formaldehyde | 0.28 mmol/l | was contacted with the resin at a rate of 47 ml/min, or 1.2 gpm/ft$^3$. Samples of the effluent were collected after every 40 bed volumes, or 12 l, of rinse water put through the column and measured for copper concentrate. Table II shows the results of these measurements.

TABLE II

| Bed Volumes | Copper Concentration (mg/l) |
|---|---|
| 40 | 0.1 |
| 80 | 0.1 |
| 120 | 0.1 |
| 160 | 0.2 |
| 200 | 0.2 |
| 240 | 0.3 |
| 280 | 0.4 |
| 320 | 0.4 |
| 360 | 0.5 |
| 400 | 0.5 |
| 440 | 0.6 |
| 480 | 0.8 |
| 500 | 1.0 |

EXAMPLE 3

Three hundred ml of a strong base gellular anionic resin having quaternary amine functional groups on a polystryene framework, available from Rohm & Haas as IRA-400, was loaded into a 0.6 l in exchange column. The resins anion was the chloride ion. Rinse water having the following composition:

| | |
|---|---|
| Copper/EDTA chelate | 0.28 mmol/l |
| EDTA | 0.28 mmol/l |
| Potassium Chloride | 1.13 mmol/l |
| Potassium Formate | 1.13 mmol/l |
| N,N,N',N'— tetrakis (2-hydroxy propyl) ethylene diamine | 0.04 mmol/l |
| Formaldehyde | 0.28 mmol/l | was eluted through the ion exchange column at a rate of 80 ml/min, or 2.0 gpm/ft$^3$. Samples of the columns effluent were taken every 40 bed volumes, or 12 liters, and measured for copper content. Table III shows the results of these measurements.

TABLE III

| Bed Volumes | Copper Concentration (mg/l) |
|---|---|
| 40 | 0.1 |
| 80 | 0.1 |
| 120 | 0.1 |
| 160 | 0.1 |
| 200 | 0.2 |
| 240 | 0.2 |
| 280 | 0.2 |
| 320 | 0.2 |
| 360 | 0.2 |
| 400 | 0.1 |
| 440 | 0.3 |
| 480 | 0.2 |
| 520 | 0.3 |
| 560 | 0.2 |
| 600 | 0.2 |
| 640 | 0.2 |
| 680 | 0.2 |
| 720 | 0.3 |
| 760 | 0.4 |
| 800 | 1.6 |

EXAMPLE 4

Three hundred ml of a strong base gellular anionic resin having quaternary amine functional groups on a polystryrene framework, available from Sybron Ionac as ASB-1, was loaded into a 0.6-1 ion exchange column. The resin's anion was the chloride ion. Rinse water having the composition given in Example 3 was eluted through the column at a rate of 80 ml/min, or 2.0 gpm/ft$^3$. Samples were taken very 40 bed volumes, or 12 liters, of rinse water put through and measured for copper content. Table IV shows the results of these measurements.

TABLE IV

| Bed Volumes | Copper Concentration (mg/l) |
|---|---|
| 40 | 0.1 |
| 80 | 0.1 |
| 120 | 0.1 |
| 160 | 0.1 |
| 200 | 0.1 |
| 240 | 0.2 |
| 280 | 0.2 |
| 320 | 0.2 |
| 360 | 0.1 |
| 400 | 0.1 |
| 440 | 0.2 |
| 480 | 0.2 |
| 520 | 0.3 |
| 560 | 0.2 |
| 600 | 0.2 |
| 640 | 0.2 |
| 680 | 0.3 |
| 720 | 0.4 |
| 760 | 0.6 |
| 800 | 1.0 |

EXAMPLE 5

An ion exchange colum as described in Example 4 was constructed. Rinse water having the following composition was eluted through the column at a rate of 80 ml/min or 2.0 gpm/ft$^3$:

| | |
|---|---|
| Copper/EDTA chelate | 0.25 mmol/l |
| EDTA | 1.00 mmol/l |
| Sodium Sulfate | 2.00 mmol/l |
| Sodium Formate | 2.00 mmol/l |
| Formaldehyde | |

Every 20 bed volumes (6 1) of rinse water throughout, samples of the effluent were taken and measured for copper content. Table V shows the results of these measurements.

TABLE V

| Bed Volumes | Copper Concentration (mg/l) |
|---|---|
| 20 | 0.1 |
| 40 | 0.2 |
| 60 | 0.1 |
| 80 | 0.3 |
| 100 | 0.4 |
| 120 | 0.5 |
| 140 | 0.2 |
| 160 | 0.5 |
| 180 | 0.9 |
| 190 | 1.5 |

EXAMPLE 6

Fifty ml of the Sybron resin used in Examples 4 and 5 were loaded into a 100 ml column. Simulated rinse water having the following composition:

| | |
|---|---|
| Copper citrate chelate | 0.59 mmol/l |
| Citrate | 0.45 mmol/l | was eluted through the column at a rate of 11 ml/min, or 1.65 gpm/ft$^3$. Samples of effluent were collected after every 40 bed volumes, or 2 1, of elute and measured for copper content. Table VI shows the results of these measurements.

TABLE VI

| Bed Volumes | Copper Concentration (mg/l) |
|---|---|
| 40 | 1.8 |
| 80 | 0.9 |
| 120 | 4.7 |
| 160 | 2.3 |
| 200 | 1.0 |
| 240 | 0.5 |
| 280 | 0.1 |

EXAMPLE 7

An ion exchange column was constructed as in Example 6. Simulated rinse water having the following composition was eluted through the column at a rate of 12 ml/min, or 1.80 gpm/ft$^3$.

| | |
|---|---|
| Copper/tartrate chelate | 0.59 mmol/l |
| Tartrate | 0.47 mmol/l |

Samples were collected after every 40 bed volumes, or 2 1, of rinse water throughput. Table VII shows the results of these measurements.

TABLE VII

| Bed Volumes | Copper Concentration (mg/l) |
|---|---|
| 40 | 0.3 |
| 80 | 0.7 |
| 120 | 0.2 |
| 160 | 0.4 |
| 200 | 0.3 |
| 240 | 0.5 |

TABLE VII-continued

| Bed Volumes | Copper Concentration (mg/l) |
| --- | --- |
| 260 | 0.1 |

EXAMPLE 8

The resin used in Example 1 was regenerated by contact with a 15 weight % of sodium chloride at a flow rate of 10 ml/min, or 0.25 gpm/ft$^3$. Samples of the effluent were collected after every 0.2 bed volumes, or 100 ml of regenerate throughout and measured for copper content. Table VIII shows the results of these measurements.

TABLE VIII

| Bed Volumes | Copper Concentration (mg/l) |
| --- | --- |
| 0.2 | 127 |
| 0.4 | 4,250 |
| 0.6 | 8,100 |
| 0.8 | 10,800 |
| 1.0 | 13,500 |
| 1.2 | 2,600 |
| 1.4 | 550 |
| 1.6 | 135 |

EXAMPLE 9

The resin used in Example 6 was regenerated by contact with a regenerating solution of 15 weight % sodium chloride. The flow rate of eluant was 1.0–2.5 ml/min, or 0.15–0.40 gpm/ft$^3$. Samples of the effluent were collected after every bed volume, or 50 ml and measured for copper content. Table IX shows the results of these measurements.

TABLE IX

| Bed Volumes | Copper Concentration (mg/l) |
| --- | --- |
| 1.0 | 1,600 |
| 2.0 | 4,500 |
| 3.0 | 1,900 |
| 4.0 | 475 |
| 5.0 | 525 |

EXAMPLE 10

The resin used in Example 7 was regenerated by contact with a 15 weight % solution of sodium chloride. The flow rate of regeneration solution was 1.0–2.5 ml/min. (0.15–0.40 gpm/ft$^3$). Samples of effluent were collected after every bed volume of regenerate throughput and measured for copper content. The results of these measurements are shown in Table X.

TABLE X

| Bed Volumes | Copper Concentration (mg/l) |
| --- | --- |
| 1.0 | 2,400 |
| 2.0 | 3,200 |
| 3.0 | 1,000 |
| 4.0 | 300 |
| 5.0 | 90 |

EXAMPLE 11

A solution containing iron/EDTA chelate, EDTA ion and no other ion was diluted through the anionic resin described in Example 4, ASB-1, available from Sybron Ionac. A solution had an initial iron concentration of about 30 to 40 ppm. A solution was eluted at a rate of approximately 2gpm/ft$^3$. Samples were taken of the effluent from the column after 10 bed volumes were deleted. The iron concentration of the effluent after 10 bed volumes were eluted was less than 2 ppm.

EXAMPLE 12

Example 11 was repeated using a solution containing iron citrate chelates and citrate. The initial concentration of iron citrate chelate was approximately 30 to 40 ppm. The solution was eluted through the column at a rate of approximately 2 gpm/ft$^3$. After 10 bed volumes of the solution was eluted through the column, the concentration of iron in the effluent was measured. It was found that less than 2 ppm of iron was present in the effluent.

EXAMPLE 13

Example 11 is repeated starting with a solution containing nickel EDTA chelates and EDTA. The solution is eluted through the column at a rate of approximately 2gpm/ft$^3$. After approximately ten bed volumes are eluted through the column, the nickel concentration in the effluent is negligible.

EXAMPLE 14

Example 11 is repeated starting with a solution containing EDTA and chelates of EDTA and group IIA alkaline earth metals, barium, calcium, magnesium. The solution is eluted through the ion exchange column as described in Example 4. After 10–20 bed volumes of solution are eluted through the column, measurements are taken of the barium, calcium and magnesium concentration in the effluent. These concentrations are negligible.

EXAMPLE 15

A solution containing lead/EDTA chelate and EDTA was eluted through a column containing the anionic resin described in Example 4. The solution had an initial concentration of lead/EDTA chelate of approximately 30–40 ppm. After about 10 bed volumes was eluted through the column, the lead concentration of the effluent was measured. The lead concentration of the effluent was less than 2 ppm.

EXAMPLE 16

Example 11 is repeated starting with a zinc-EDTA chelate, and EDTA solution. It is found after 10–20 bed volumes are eluted through the column, that the effluent concentration of zinc is negligible.

EXAMPLE 17

Example 11 is repeated. However, the starting solution contains chromium/EDTA chelates and EDTA. A starting solution containing chromium/formate and formates may also be used. A solution is eluted through the column and after 10–20 bed volumes, the chrome concentration in the effluent is measured. The chromium concentration in the effluent is found to be negligible.

EXAMPLE 18

Example 11 is repeated, however, chelates of EDTA and transition metals such as manganese, cobalt and cadmium are present in the starting solution. The solutions are eluted through a column containing an anionic exchange resin such as ASB-1. The concentrations of manganese, cobalt and/or cadmium are measured after 10-20 bed volumes of solution are eluted through the column. These concentrations are found to be negligible.

What is claimed is:

1. A process for treating waste solutions from electroless plating baths the waste solutions containing complexed metal ions and a complexing agent for said metal ions, comprising contacting said waste solutions wiht an anionic exchange resin which is loaded with an anion and which is capable of selectively removing complexed metal ions and complexing agents, for said metal ions from said waste solutions; subsequently eluting a solution of free complexing agent through the resin and then eluting an inorganic saline solution through the resin to separate organometallic complexes from the free complexing agent in the waste solutions.

2. A process for removing from electroless plating solution aqueous waste streams complexed metal ions and a complexing agent for said complexed metal ions, said complexing agent being an anion, the process comprising first contacting said waste streams with an anionic exchange resin, then eluting a solution of free complexing agent through said anionic exchange resin, and then eluting an inorganic saline solution through the resin, said resin thereby being loaded with a non-complexing anion which is present in the waste streams and which does not complex with said metal ions or forms a weaker complex with said metal than said complexing agent, to separate organometallic complexes from the free complexing agent in the waste solution, the resultant eluant having less than 1 mg per liter of metal ions.

3. A process according to claim 1 or 2 wherein about 50% to about 100% of the complexed metal ions are removed from said waste solution.

4. A process according to claim 1 or 2 wherein said process is performed at a temperature between about 0° F. and 100° F.

5. A process according to claim 1 or 2 wherein the waste solution is eluted through the exchange resin at a rate of between about 10 and about 100 liter/hour liter resin.

6. A process according to claim 1 or 2 wherein said aqueous waste solution is a rinse water solution.

7. A process according to claim 1 or 2 wherein said metal ion is selected from the group of metals which form an organometallic complex with said complexing agent.

8. A process according to claim 1 wherein said metal is selected from the group of metals consisting of barium, calcium, magnesium, lead, zinc, chromium, iron, copper, manganese, nickel, cobalt, and cadmium.

9. A process according to claim 1 or 2 wherein said complexing agent is an organic compound.

10. A claim according to claim 9 wherein said organic compound is an ethylene diamine derivative compound.

11. A claim according to claim 10 wherein said compound is ethylenediaminetetraacetic acid.

12. A claim according to claim 9 wherein said compound is selected from the group consisting of organic acids, organic acid esters and organic acid salts.

13. A claim according to claim 12 wherein said compound is selected from the group consisting of citric acid, citrate, tartaric acid and tartrate.

14. A process according to claim 1 or 2 wherein said anionic exchange resin is a strong base anionic exchange resin.

15. A process according to claim 1 or 2 wherein said resin is selected from the group consisting of a macroreticular resin and a gellular resin.

16. A process according to claim 1 or 2 wherein said metal ions are copper ions.

17. A process according to claim 16 wherein said metal ions are copper and said complexing agent is ethylenediamine tetraacetic acid.

18. A process for removing from aqueous waste solutions from electroless plating processes, complexed metal ions and a complexing agent for said coplexed metal ions, said complexing agent being an anion, the process comprising:
  a. contacting said waste solutions with an anionic exchange resin, said resin, being loaded with an anion which does not complex with said metal ions or which forms a weaker complex with said metal than said complexing agent, to selectively remove said complexed metal ions and said complexing agent form said waste solutions such that the resultant eluant has a metal concentration less than 1 mg per liter;
  b. subseguent to step (a), contacting said anionic exchange resin with a salt solution or with a complexing agent followed by a salt solution so as to elute complexing agent and complexed metals or complexed metals from said resin.

* * * * *

UNITED STATES PATENT AND TRADEMARK OFFICE
CERTIFICATE OF CORRECTION

PATENT NO. : 4,770,788
DATED : September 13, 1988
INVENTOR(S) : Michael Vignola

It is certified that error appears in the above-identified patent and that said Letters Patent is hereby corrected as shown below:

IN THE SPECIFICATION

Column 2, line 68: delete "cellular" and insert therefor --gellular--.

Column 3, line 2: delete "cellular" and insert therefor --gellular--.

Column 5, line 41: delete "guaternary" and insert therefor --quaternary--.

Column 9, line 64: delete "diluted" and insert therefor --eluted--.

Column 10, line 2: delete "deleted" and insert therefor --eluted--.

IN THE CLAIMS

Claim 1, line 8: correct "wiht" to --with--.

Claim 18, line 30: correct "coplexed" to --complexed--.

UNITED STATES PATENT AND TRADEMARK OFFICE
CERTIFICATE OF CORRECTION

PATENT NO. : 4,770,788
DATED : September 13, 1988
INVENTOR(S) : Michael Vignola

It is certified that error appears in the above-identified patent and that said Letters Patent is hereby corrected as shown below:

Claim 18, line 39: Correct "form" to --from--.

line 42: correct "subseguent" to --subsequent--.

Signed and Sealed this

Twenty-eighth Day of February, 1989

Attest:

DONALD J. QUIGG

Attesting Officer    Commissioner of Patents and Trademarks